Feb. 7, 1956  S. R. NAYSMITH  2,734,127
CEILING
Filed March 11, 1947  4 Sheets-Sheet 1
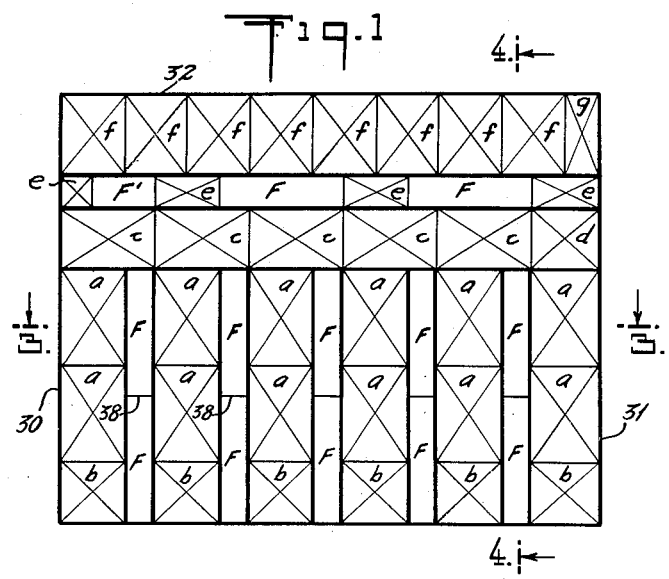
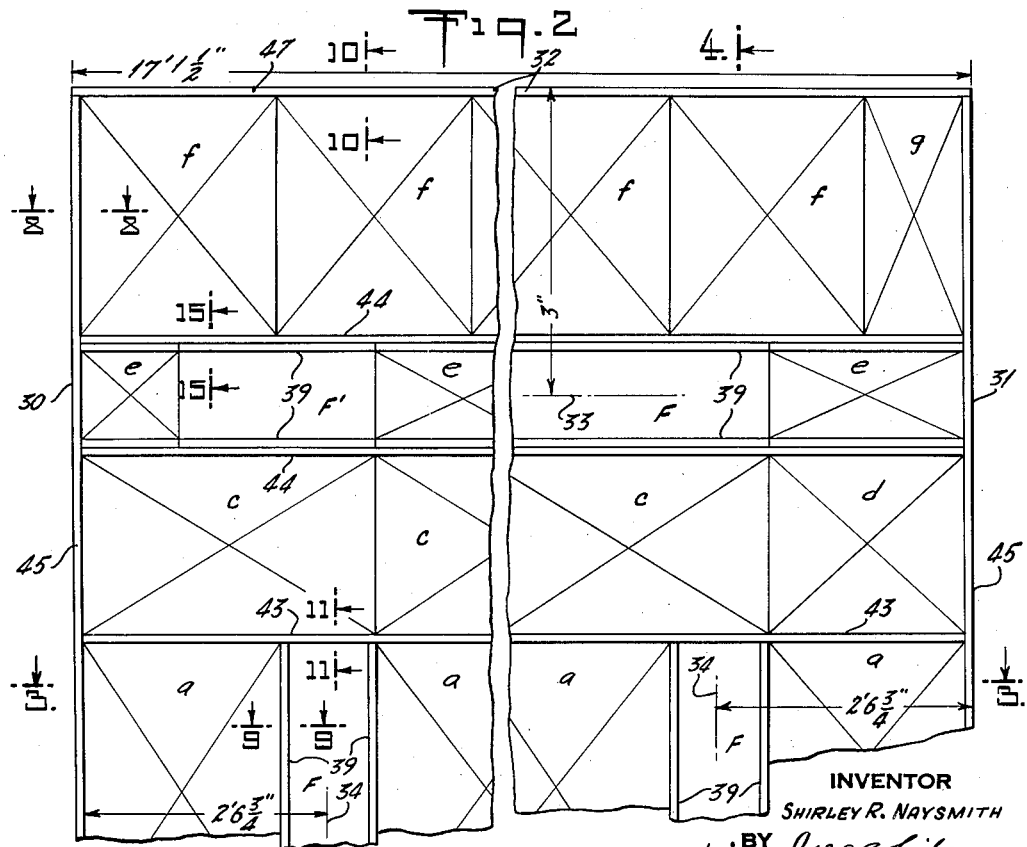
INVENTOR
SHIRLEY R. NAYSMITH
BY Joe B. Hiberman
ATTORNEY Feb. 7, 1956  S. R. NAYSMITH  2,734,127
CEILING
Filed March 11, 1947  4 Sheets-Sheet 2
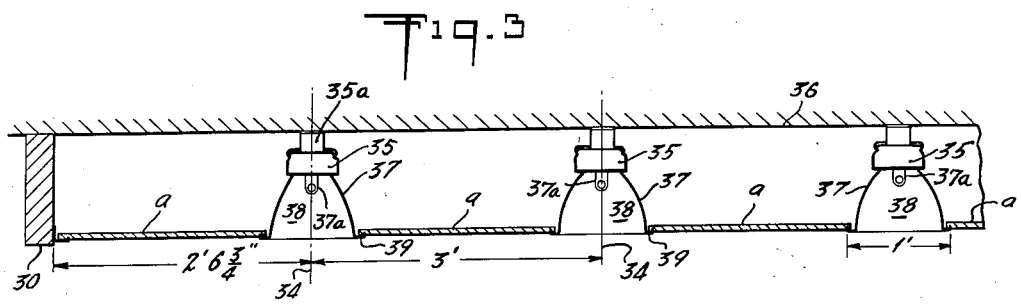
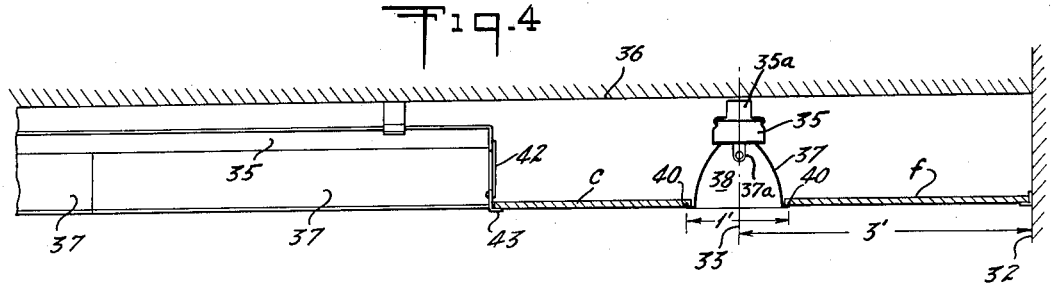
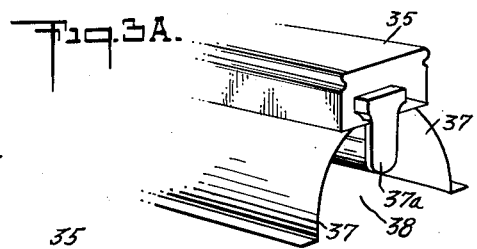
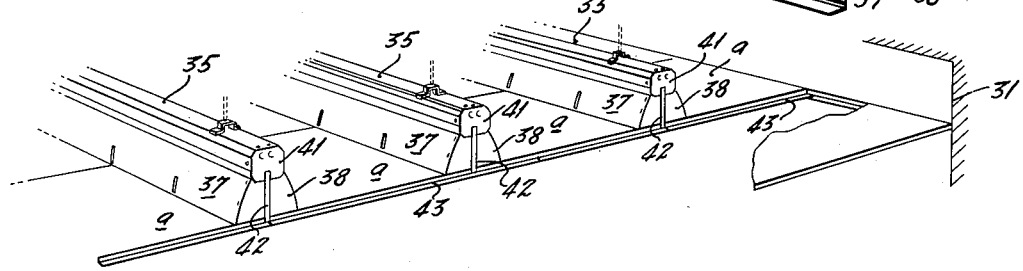
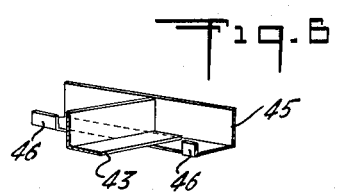
INVENTOR
SHIRLEY R. NAYSMITH
BY
ATTORNEY Feb. 7, 1956 S. R. NAYSMITH 2,734,127
CEILING
Filed March 11, 1947 4 Sheets-Sheet 3
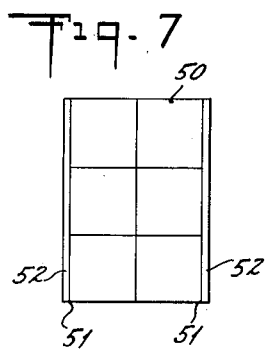
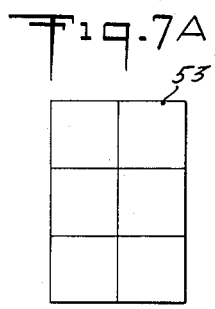
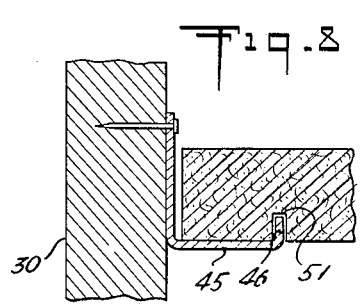
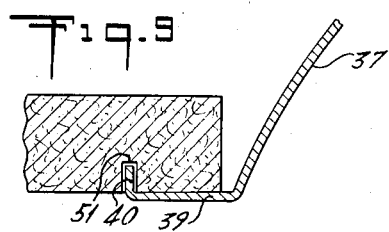
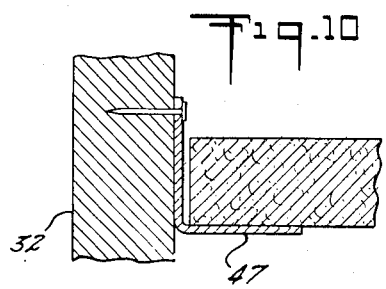
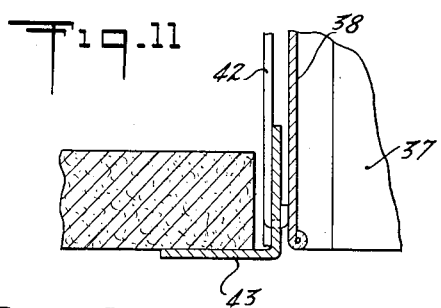
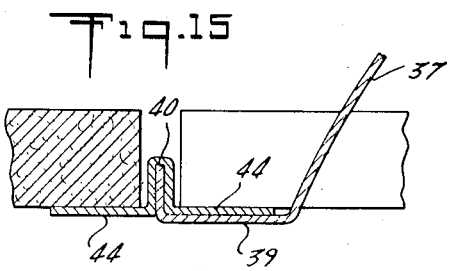
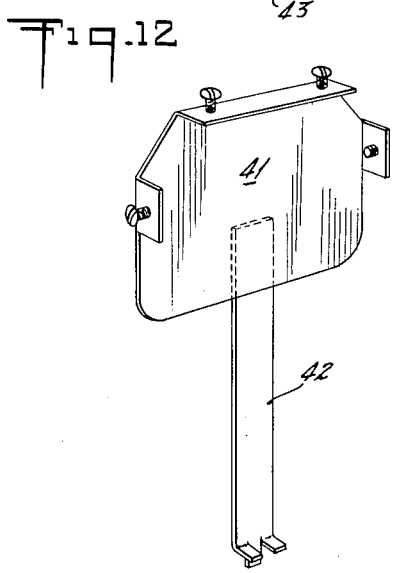
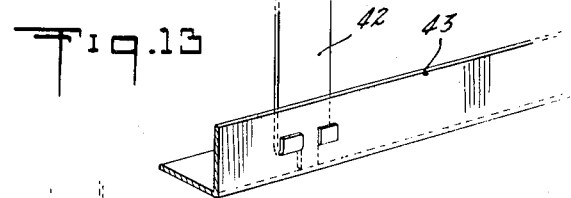
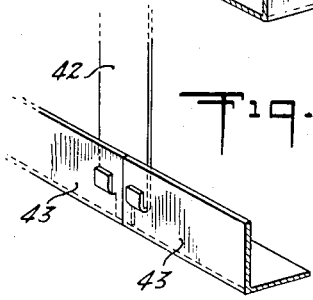
INVENTOR
SHIRLEY R. NAYSMITH
BY
ATTORNEY

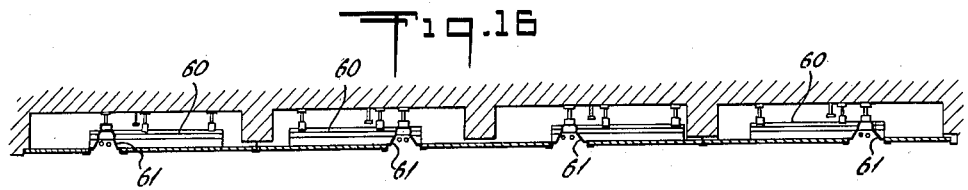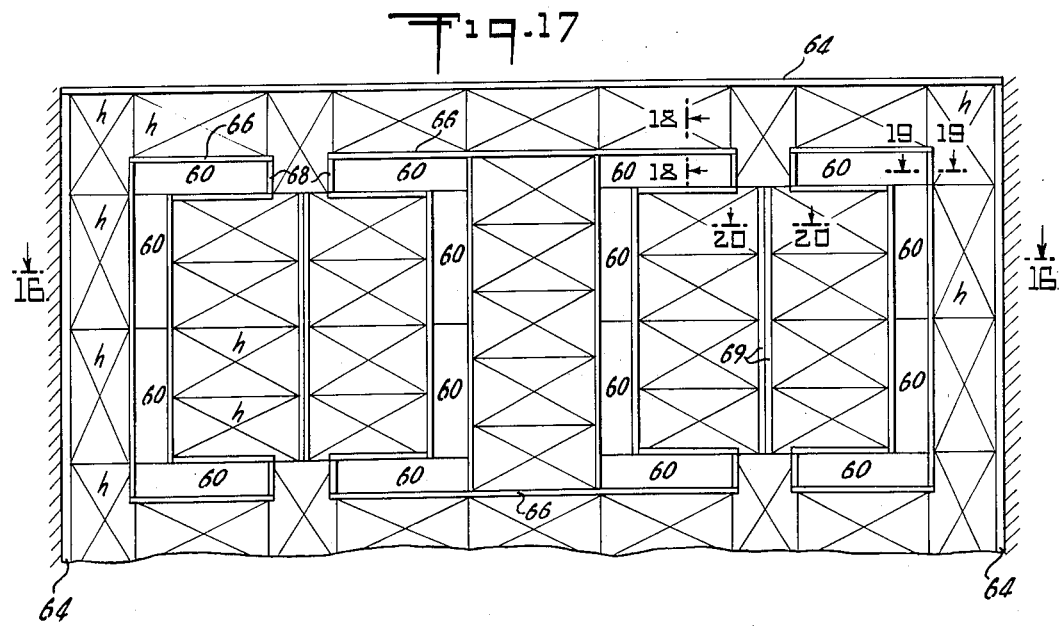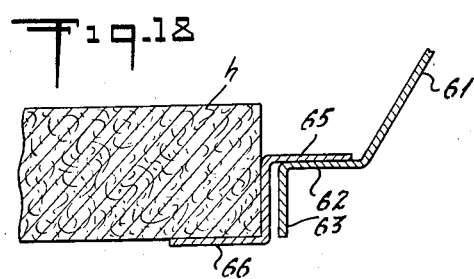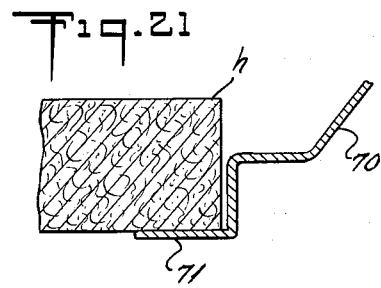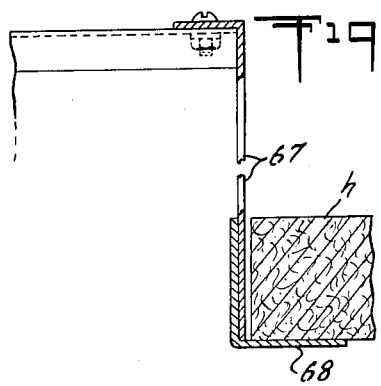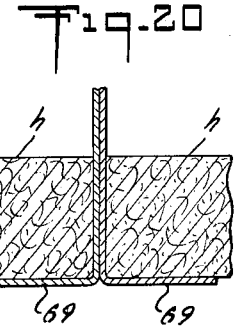

United States Patent Office 2,734,127
Patented Feb. 7, 1956

2,734,127
CEILING

Shirley R. Naysmith, Meriden, Conn., assignor to The Miller Company, Meriden, Conn., a corporation of Connecticut Application March 11, 1947, Serial No. 733,821

4 Claims. (Cl. 240—9)

The present invention relates to ceilings and is more particularly directed toward ceiling installations in which a portion of the ceiling is composed of direct lighting equipment.

It has heretofore been customary to provide ceilings with flush inbuilt lighting equipment in which the ceiling surfacing material whether tile or other form of material was supported from suitable hidden structures between the suspended ceiling and the overhead supports. There is also shown in my Patent No. 2,376,715 granted May 22, 1945, a type of combined ceiling and lighting equipment in which yokes supported from the superstructure carry lighting fixtures or ceiling, or both lighting fixtures and ceiling. In these various prior art arrangements considerable structural elements are required in addition to the lighting fixtures and wiring devices per se and the ceiling surfacing per se.

The present invention contemplates an arrangement of combined lighting equipment and ceiling in which the ceiling surfacing material is preferably in the form of light weight tile and is directly supported from the fixtures thereby avoiding the expense of structures in addition to the lighting equipment for the support of the ceiling.

The accompanying drawings show, for purposes of illustrating the present invention, two embodiments in which the invention may take form, it being understood that the drawings are illustrative of the invention rather than limiting the same.

In these drawings:

Figures 1 and 2 are inverted plan views of a form of combined lighting equipment (of the single lamp light weight troffer type) and ceiling; Figure 2 being at a larger scale;

Figure 3 is a section on the line 3—3 of Figures 1 and 2 illustrating the arrangement of parallel fixtures parallel with a room wall;

Figure 3A is a fragmentary, perspective view of a single lamp, light weight troffer;

Figure 4 is a section on the line 4—4 of Figures 1 and 2 illustrating the arrangement of fixtures at right angles to one another;

Figure 5 is a perspective view showing a number of fixtures parallel with one another with their ends spaced from a wall;

Figure 6 is a fragmentary perspective view of a detail of Figure 5 at an enlarged scale;

Figures 7 and 7A illustrate two pieces of ceiling tile, with and without selvage edges, respectively;

Figure 8 is a section on the line 8—8 of Figure 2 illustrating the support of a selvage edged tile from a wall carried ledge;

Figure 9 is a section on the line 9—9 of Figure 2 illustrating the support of a selvage edged tile from the side flange of a fixture;

Figure 10 is a section on line 10—10 of Figure 2, illustrating the support of a tile without selvage edge;

Figure 11 is a section on the line 11—11 of Figure 2 illustrating the support of tile from the end of a fixture;

Figure 12 is a perspective view of a combined end plate for the wiring channel of the fixture and support for the ledge or strip at the end of the fixture for supporting tile;

Figures 13 and 14 are perspective views illustrating the securement of the strips to the support of Figure 12;

Figure 15 is a sectional view illustrating the support of a non-selvage edged tile from the side flange of the fixture;

Figures 16 and 17 are transverse sectional and inverted plan views, respectively, of a modified form of construction suitable for two lamp troffers with porcelain enameled reflectors, Figure 16 being a section on line 16—16 of Figure 17;

Figures 18–20 inclusive, are fragmentary sections on the lines 18—18 to 20—20, respectively, of Figure 17; and Figure 21 illustrates a further modification.

The fixtures or troffers are usually one foot wide with a length in even feet so that they fit into a ceiling in which the ceiling tile has a modulus of one foot. The drawing illustrates several fixtures of four foot lengths and each fixture is designated F. One two foot fixture is illustrated at F'. While most of the area of a ceiling may be occupied by modular ceiling tile and fixtures one foot wide and of even foot length, it is usual to require fitting about one or more walls of the room. The arrangement illustrated in Figures 1–14 is one which requires such fitting, and to facilitate the following description actual dimensions will be stated, such dimensions being purely illustrative.

The room of Figures 1–5 is assumed to have a width of 17′1½″ between side walls 30 and 31 and to have an end wall 32. Adjacent the end wall 32 is a row of fixtures F, F′ whose center line 33 is three feet from this end wall, while two feet from the edge of this row of fixtures the drawings show five parallel rows of fixtures F spaced three feet apart and with the center lines 34 of the side rows 2′6¾″ from the side walls 30 and 31. These dimensions are indicated in Figures 2, 3, and 4.

The lighting equipment employs wiring channels 35 supported in any convenient manner, for example, by clamps 35a at a common level below the structural ceiling 36 and above the center lines of the fixtures. Each fixture has the usual fluorescent lamp 37a and lamp sockets 37b (Figure 3A) and a reflector 37, and the ends of the reflector are closed by end plates 38. The reflectors are made of sheet aluminum and have outwardly extending flanges or ledges 39 (Figures 9 and 15) provided with upwardly extending stiffening edges 40. These edges are spaced one foot apart. The ends of the wiring channels 35 are closed by plates 41 (Figures 5 and 12) carrying downwardly extending straps 42 which in turn support angle members 43, as indicated more clearly in Figures 2, 5, 11, 13 and 14. These angle members are of varying length and may reach from one row of fixtures to the adjacent row of fixtures or to the wall as indicated in Figure 6.

Where all the fixtures of a row are not end to end, as indicated in the upper part of Figures 1 and 2, the side flanges 39 of the fixtures carry, as shown in Figure 15, a strip 44 which fits the reflector flanges 39 and upturned edges 40 and spans the space between the aligned flanges of the fixtures of the row so as to form a continuous support.

The side walls 30 and 31 of the room carry, at the same level as the reflector flanges 39, angle strips 45 with upwardly bent edges 46. The end wall 32 carries an angle strip 47 (Figure 10) having no upwardly bent edge.

The flanges on the sides of the reflector and the angle strips carried by the ends of the reflectors and along the walls provide a lattice-like arrangement of ledges all at a common level either parallel to one another or at right angles to one another and these ledges are suitable for the support of the ceiling tile.

The ceiling surfacing material to be used in such installations is preferably made of a very light weight type of material such as available in the form of glass wool tile. Two types of tile are illustrated in Figures 7 and 7A, the tile 50 of Figure 7 being a nominal 2'x3' tile with grooves 51 two feet apart and selvage edges 52—52, while the tile 53 of Figure 7A is a 2'x3' tile. Other sizes in even foot dimensions are also made. The grooves in the selvage edged tile are adapted to fit the upwardly extending edges 40 of the reflectors and 46 of the side wall strips.

In the layout of Figures 1 and 2, 2'x3' selvage tile are indicated by the letter *a*; 2'x2' selvage tile by the letter *b*; non-selvage 2'x3' tile by the letter *c*; non-selvage 2'x2' tile by the letter *d*; and non-selvage tile 1' wide by the letter *e*. These tile fill the space in Figure 1 below the upper row of fixtures. The distances from the side flanges 39 of these fixtures to the wall 32 is 2½' and to fill this space tile 3' long are cut to 2½'. These shortened tile are indicated by the letters *f* and *g*.

After the fixtures and tile supporting strips are in place the ceiling tile may be passed upwardly through the intervening spaces and swung into position so that a complete hung ceiling and fixture installation is provided.

The arrangement shown in Figures 16–20 is illustrative of a different layout of fixtures of a different type, employing ceiling surfacing material without selvage edges. Here the fixtures 60 may be of the two lamp type such as shown in my Patent No. 2,376,715 and have porcelain enameled reflectors 61 outwardly flanged at 62 and downwardly flanged at 63. The width of the reflectors, between the flanges 63 is 1'. The fixtures 60 are all mounted at a common level below the structural ceiling and in various parallel and right angled arrangements. Angle members 64, similar to angle members 47 are mounted on the wall at the level of the bottom of the fixture reflectors. The side flanges of the reflectors carry strips 65 (Figure 18) and these strips have lower portions 66 at the same level as the strips 64. Strips 66 may be of the same length as the fixture or row of fixtures or may be longer where one desires to span the space between fixtures in a row. The ends of the fixtures carry straps 67 which support angle members 68 similar to the angle members 43. Where the distance between parallel fixtures is too great to be spanned by a single piece of tile, angles 69 similar to angles 68 are suitably supported from the superstructure. Ceiling tile such as designated by the letter *h*, of suitable dimension, preferably modular, so far as conditions permit, may be supported from the lighting equipment and the auxiliary strips carried by the walls, and superstructure.

Figure 21 illustrates a variation in the construction of Figure 18 according to which the reflector 70 has a flange 72 which supports the ceiling tile directly.

Since it is obvious that the invention may be embodied in other forms and constructions within the scope of the claims, I wish it to be understood that the particular forms shown are but a few of these forms, and various modifications and changes being possible, I do not otherwise limit myself in any way with respect thereto.

What is claimed is:

1. In a combined lighting fixture and ceiling installation, a plurality of parallel wireways, direct lighting reflectors carried by the wireways, the ends of the reflectors and wireways being in alignment with one another, an L-shaped furring strip extending transversely of the ends of the reflectors at the level of the mouths thereof, and wireway carried supports for the furring strip.

2. An over-all ceiling surfacing treatment for installation below a structural ceiling to completely conceal the same, and comprising, in combination, a plurality of wiring channels parallel with one another and supported below the structural ceiling at a common level, inverted, channel-carried reflecting troughs having downwardly extending side walls, said side walls carrying along the lower edges thereof parallel, outwardly extending, generally horizontal stiffening flanges all at a common lower level to provide side ledges extending toward similar ledges of adjacent reflecting troughs, channel-carried means to support fluorescent lamps to thereby form a direct lighting system with spaced units parallel with one another separated by elongated spaces between the ledges provided by adjacent troughs, and rectangular ceiling surfacing units disposed edge to edge and supported at their opposite ends solely by the adjacent stiffening flanges of two parallel adjacent reflecting troughs so as to close the spaces therebetween.

3. An over-all ceiling surfacing treatment for installation adjacent a wall and below a structural ceiling to completely conceal the ceiling and upper portion of the wall, and comprising, in combination, a plurality of wiring channels parallel with one another and the wall and supported below the structural ceiling at a common level, inverted, channel-carried reflecting troughs having downwardly extending side walls, said side walls carrying along the lower edges thereof parallel, outwardly extending, generally horizontal stiffening flanges all at a common lower level to provide side ledges extending toward similar ledges of adjacent reflecting troughs, channel-carried means to support fluorescent lamps to thereby form a direct lighting system with spaced units parallel with one another separated by elongated spaces between the ledges provided by adjacent troughs, rectangular ceiling surfacing units disposed edge to edge and supported at their opposite ends solely by the adjacent stiffening flanges of two parallel adjacent reflecting troughs so as to close the spaces therebetween, an auxiliary ledge parallel with and facing one of the ledges on one of the troughs and fixedly supported alongside the wall at the same level as the other ledges, and similar ceiling surfacing units supported solely by the auxiliary ledge and the trough flanges adjacent thereto so as to close the space therebetween.

4. An over-all ceiling surfacing treatment for installation adjacent two walls at right angles to one another and below a structural ceiling to completely conceal the ceiling and upper portion of the walls, and comprising, in combination, a plurality of wiring channels parallel with one another and one wall and supported below the structural ceiling at a common level, inverted, channel-carried reflecting troughs having downwardly extending side walls, said side walls carrying along the lower edges thereof parallel, outwardly extending, generally horizontal stiffening flanges all at a common lower level to provide side ledges extending toward similar ledges of adjacent reflecting troughs, channel-carried means to support fluorescent lamps to thereby form a direct lighting system with spaced units parallel with one another separated by elongated spaces between the ledges provided by adjacent troughs, rectangular ceiling surfacing units disposed edge to edge and supported at their opposite ends solely by the adjacent stiffening flanges of two parallel adjacent reflecting troughs so as to close the spaces therebetween, an auxiliary ledge parallel with and facing one of the ledges on one of the troughs and fixedly supported alongside the said wall at the same level as the other ledges, similar ceiling surfacing units supported solely by the auxiliary ledge and the trough flanges adjacent thereto so as to close the space therebetween, the ends of the troughs being closed, wiring channel supported, outwardly extending end ledges at right angles to the side flanges and at the level of the side flanges, a second auxiliary ledge parallel with and facing the said end ledges and fixedly supported alongside the other wall at the same level as the other ledges, and similar ceiling surfacing units supported solely by the second auxiliary ledge and the adjacent end ledge of the troughs so as to close the space therebetween.

References Cited in the file of this patent

UNITED STATES PATENTS

| Number | Name | Date |
|---|---|---|
| 2,017,911 | Manske et al. | Oct. 22, 1935 |
| 2,255,511 | Muller | Sept. 9, 1941 |
| 2,291,489 | Naysmith | July 28, 1942 |
| 2,306,597 | Darley | Dec. 29, 1942 |
| 2,334,484 | Dunbar | Nov. 16, 1943 |
| 2,376,715 | Naysmith | May 22, 1945 |
| 2,382,456 | Urbain | Aug. 14, 1945 |
| 2,427,937 | Willson | Sept. 23, 1947 |
| 2,518,724 | Runge | Aug. 15, 1950 |